United States Patent
Amrany et al.

(10) Patent No.: US 6,584,160 B1
(45) Date of Patent: Jun. 24, 2003

(54) SYSTEM AND METHOD FOR REDUCING THE EFFECTS OF CLIPPING IN A DMT TRANSCEIVER

(75) Inventors: Daniel Amrany, Ocean Township, NJ (US); Lujing Cai, Trinton Falls, NJ (US); Weimin Liu, Aberdeen, NJ (US)

(73) Assignee: GlobespanVirata, Inc., Red Bank, NJ (US)

( * ) Notice: Subject to any disclaimer, the term of this patent is extended or adjusted under 35 U.S.C. 154(b) by 0 days.

(21) Appl. No.: 09/373,841

(22) Filed: Aug. 13, 1999

Related U.S. Application Data
(60) Provisional application No. 60/096,410, filed on Aug. 13, 1998.

(51) Int. Cl.[7] .............................................. H04L 25/49
(52) U.S. Cl. ........................ 375/296; 375/285; 375/222
(58) Field of Search ............................... 375/295, 269, 375/259, 260, 222, 254, 285, 242, 346; 370/317, 319, 468, 525, 526, 210, 480, 481, 482, 484, 485

(56) References Cited

U.S. PATENT DOCUMENTS

| | | | |
|---|---|---|---|
| 5,623,513 A | * 4/1997 | Chow et al. ................. 375/219 |
| 5,633,863 A | 5/1997 | Gysel et al. ................. 370/290 |
| 5,740,242 A | 4/1998 | Hayashi ....................... 379/411 |
| 5,787,113 A | 7/1998 | Chow et al. ................. 375/219 |
| 5,835,536 A | * 11/1998 | May et al. .................... 375/260 |
| 6,038,261 A | * 3/2000 | Mestdagh .................... 327/310 |
| 6,081,502 A | * 6/2000 | Paneth et al. ............... 370/210 |
| 6,125,103 A | * 9/2000 | Bauml et al. ............... 370/203 |
| 6,130,918 A | * 10/2000 | Humphrey et al. ......... 375/285 |
| 6,314,146 B1 | * 11/2001 | Tellado et al. .............. 375/285 |
| 6,366,555 B1 | * 4/2002 | Gatherer et al. ............ 370/210 |

* cited by examiner

*Primary Examiner*—Chi Pham
*Assistant Examiner*—Khanh Tran
(74) *Attorney, Agent, or Firm*—Thomas, Kayden, Horstemeyer & Risley (57) ABSTRACT

The present invention is directed to a system and method for reducing the need to perform signal clipping in a DMT transmitter. In accordance with one aspect of the invention, a method performs an inverse Fourier Transform on the input to produce a time-domain, digital value to be transmitted to a remote receiver. The method then evaluates the magnitude of the digital value to determine whether the magnitude exceeds a threshold value. Then, the method alters the input and re-performs an inverse Fourier Transform on the altered input, only if the step of evaluating the magnitude determines that the magnitude of the digital value exceeds the threshold value.

9 Claims, 6 Drawing Sheets

SYSTEM AND METHOD FOR REDUCING THE EFFECTS OF CLIPPING IN A DMT TRANSCEIVER

CROSS-REFERENCE TO RELATED APPLICATION

The present application claims the benefit of U.S. provisional patent application, Ser. No. 60/096,410, filed Aug. 13, 1998, which is hereby incorporated by reference in its entirety.

BACKGROUND OF THE INVENTION

1. Field of the Invention

The present invention generally relates to digital transmission systems, and more particularly relates to a system and method for reducing the effects of clipping in a DMT transceiver.

2. Discussion of the Related Art

In order to make high data rate interactive services such as video conferencing available to more residential and small business customers, high-speed data communication paths are required. Although fiber optic cable is the preferred transmission media for such high data rate services, it is not readily available in existing communications networks, and the expense of installing fiber optic cable is prohibitive. Current telephone wiring connections, which consist of copper twisted-pair media, are not designed to support the data rates, or bandwidth, required for interactive services. Asymmetric Digital Subscriber Lines (ADSL) technology has been developed to increase the effective bandwidth of existing twisted-pair connections, allowing interactive services to be provided without requiring the installation of new fiber optic cable.

Discrete Multi-Tone (DMT) is a multicarrier technique that divides the available bandwidth of twisted-pair connections into many subchannels. The DMT technique has been adopted by the ANSI T1E1.4 (ADSL) committee for use in ADSL systems. In ADSL, DMT is used to generate 250 separate 4.3125 kHz subchannels from 26 kHz to 1.1 MHz for downstream transmission to the enduser, and 26 subchannels from 26 kHz to 138 kHz for upstream transmission by the enduser. The transmission capability of the individual subchannels are evaluated for each connection, and data is allocated to the subchannels according to their transmission capabilities (the number of bits each subchannel can support). Subchannels that are not capable of supporting data transmission are not used, whereas the bit-carrying capacity of subchannels that can support transmission is maximized. Thus, by using DMT in an ADSL system, the transmission capability of each twisted-pair connection is maximized over the fixed bandwidth.

Once the transmission capability of a connection has been established, the data transfer process begins by encoding the data. Data in an ADSL system is grouped in frames, where a frame represents a time-slice of the data to be transmitted. Bits from the frames are assigned to the subchannels based on the number of bits that each subchannel can support, and the subchannels are encoded by creating a frequency-domain vector set. Frequency-domain vectors in the vector set use phase and magnitude components to encode the values of the bits. An Inverse Fast Fourier Transform (IFFT) performs a frequency-to-time conversion of the frequency-domain vectors, resulting in digital time-domain information. A digital-to-analog converter (DAC) then converts the digital information to an analog signal which a transmitter transmits onto the copper twisted-pair media. The ANSI T1E1.4 standard defines the average power requirement of the signal for transmission on the twisted pair media, and in order to satisfy the power requirement, an amplifier is required.

When the analog signal from the DAC overshoots a magnitude threshold, which is dependent on the power supply used in the system, clipping of the signal can occur. Peaks in the analog signal occur when the vectors in the frequency-domain vector set are combined through the IFFT. Each frequency-domain vector contributes to the magnitude of the time-domain signal, and if the frequency-domain vectors are such that their contributions are concentrated in one area of the time-domain signal, peaks can result. Clipping occurs when the Integrated Circuit (IC) on which the transmitter is fabricated cannot support the dynamic range requirements of the peaking signal and can result in the loss of information. Section 7.11.1 of the T1E1.4 standard addresses this problem and limits the information loss by specifying that the probability of the signal clipping be less than one in 10 million.

The probability of a peak exceeding the magnitude threshold (maximum signal power on the IC) is based on the Peak-to-Average Ratio (PAR) of the signal, which is a ratio of the maximum power of the signal to the average power of the signal. If the average power is small compared to the magnitude threshold, a large peak can occur without exceeding the point where clipping occurs. Therefore, one method of reducing the number of peaks exceeding the magnitude threshold for a fixed PAR is to reduce the average power of the signal. Although this reduces the occurrence of clipping, lower signal strength increases susceptibility to noise, which can cause other transmission problems. Another method of reducing the probability of clipping utilizes a larger power supply, which raises the magnitude threshold where clipping occurs. A larger power supply, however, increases cost and consumes excessive power and adds additional regulatory requirements.

Therefore, a need exists for a method and/or apparatus to reduce the occurrence of signal peaks in a DMT transmitter such that the power supply of the system can be reduced, the signal strength can be raised, and/or the probability of the signal clipping can be reduced.

Figure 1:
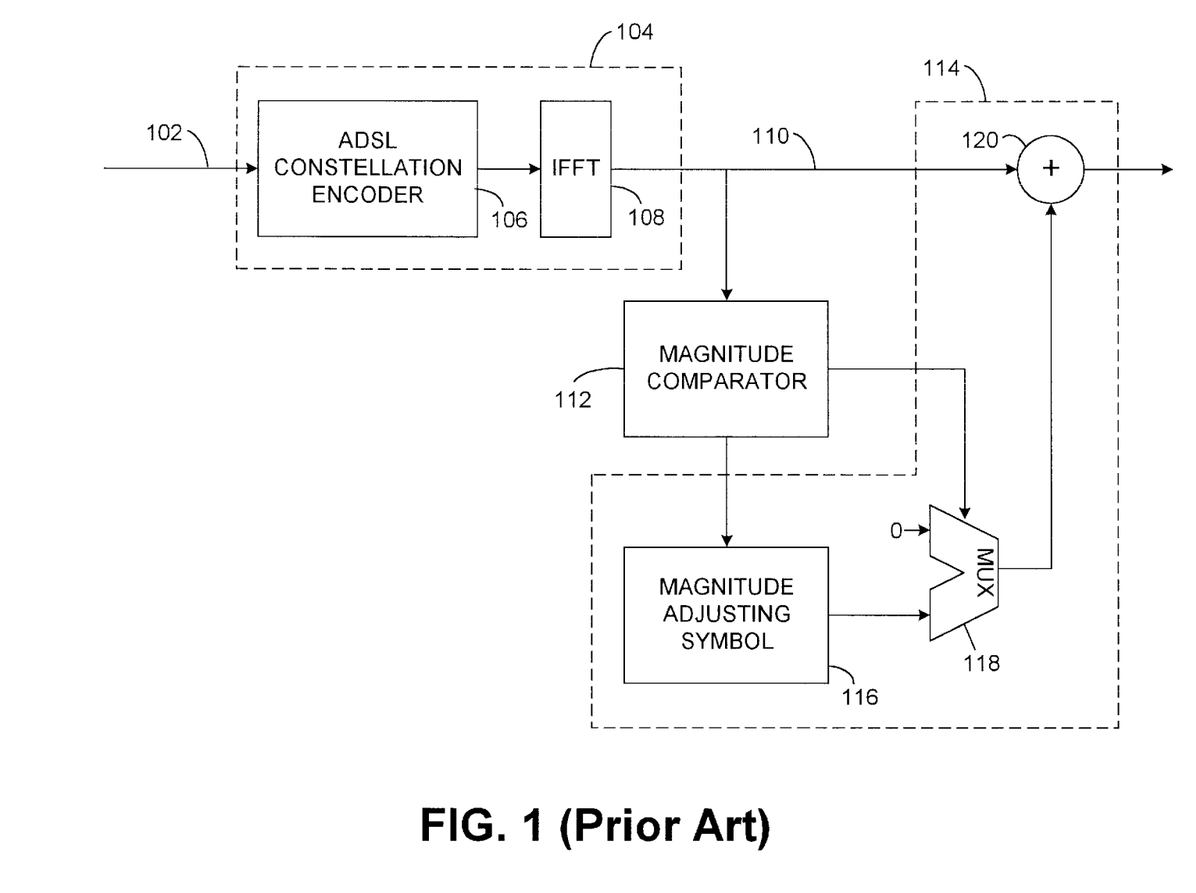
FIG. 1 is a block diagram illustrating one prior art system.

Several approaches to address this problem have been made by systems known in the prior art. For example, U.S. Pat. No. 5,835,536 discloses one such system. As illustrated in FIG. 1, U.S. Pat. No. 5,835,536 discloses a system having a DMT transmitter including a symbol generator 104, a magnitude comparator 112, and a magnitude adjuster 114. The DMT transmitter receives framed data 102 at the symbol generator 104 and generates a time-domain DMT symbol 110 based on the framed data 102. In an ADSL system, the symbol generator 104 includes an ADSL constellation encoder 106 and an IFFT block 108. The ADSL constellation encoder 106 encodes the framed data 102 by mapping the values of the data bits to frequency-domain vectors on subchannels within the bandwidth used for ADSL transmission. The number of bits that can be encoded on each subchannel may be determined by sending a training signal. The IFFT block 108 transforms the frequency-domain vectors to the time-domain, resulting in a time-domain DMT symbol 110.

The magnitude comparator 112 compares the magnitude of the time-domain DMT symbol 110 to a magnitude threshold to determine if clipping will occur. The magnitude adjuster 114 includes a magnitude adjusting symbol 116, a multiplexer or mux 118, and an adder 120. When the magnitude comparator 112 determines that the magnitude of the time-domain DMT symbol 110 is such that clipping will occur, it directs the mux 118 to pass the magnitude adjusting symbol 116 to the adder 120 which adds it to the time-domain DMT symbol 110 such that magnitude of the time-domain DMT symbol 110 is reduced, effectively reducing the PAR of the system.

Such a system, however, always makes the same magnitude of adjustment, regardless of how much the magnitude exceeds the clipping threshold.

Figure 2:
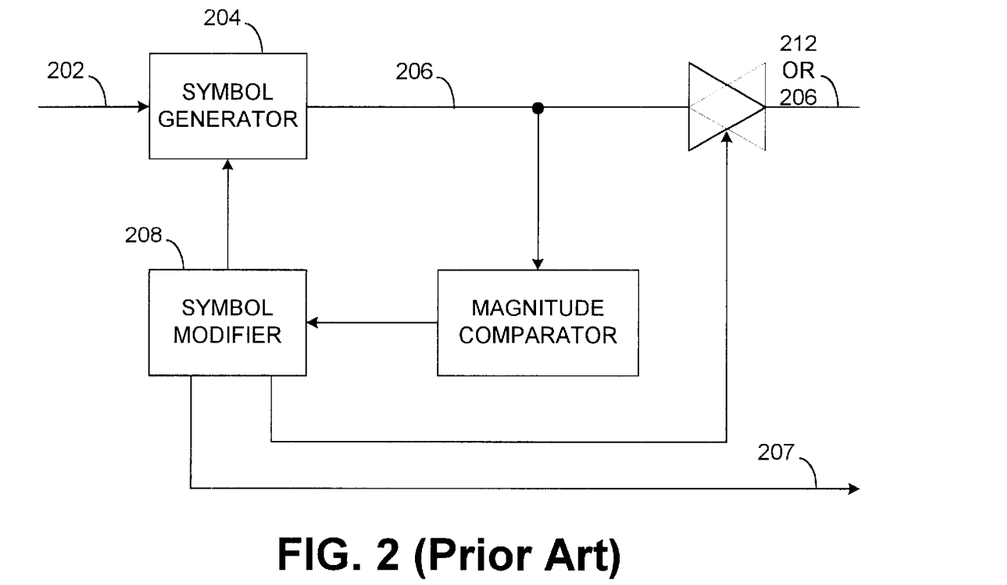
FIG. 2 is a block diagram illustrating another system known in the prior art.

As illustrated in FIG. 2, U.S. Pat. No. 5,835,536 also discloses an alternative DMT transmitter which includes a symbol generator 204, a magnitude comparator 210, and a Symbol modifier 208. The symbol generator 204 generates a time-domain DMT symbol 206 based on the framed data 202. The magnitude comparator 210 compares the magnitude of the time-domain DMT symbol 206 to a magnitude threshold to determine if clipping will occur. When the magnitude of the time-domain DMT symbol 206 compares unfavorably to the magnitude threshold, the symbol modifier 208 modifies the time-domain DMT symbol 206 to produce a modified time-domain DMT symbol 212 of reduced magnitude. The symbol modifier 208 may modify the symbol by altering the mapping function used for encoding the data, altering certain vectors in the frequency-domain representation of the DMT symbol, etc. The symbol modifier 208 may also produce a modification signal 207, wherein the modification signal 207 characterizes the modified time-domain DMT symbol 212.

Figure 3:
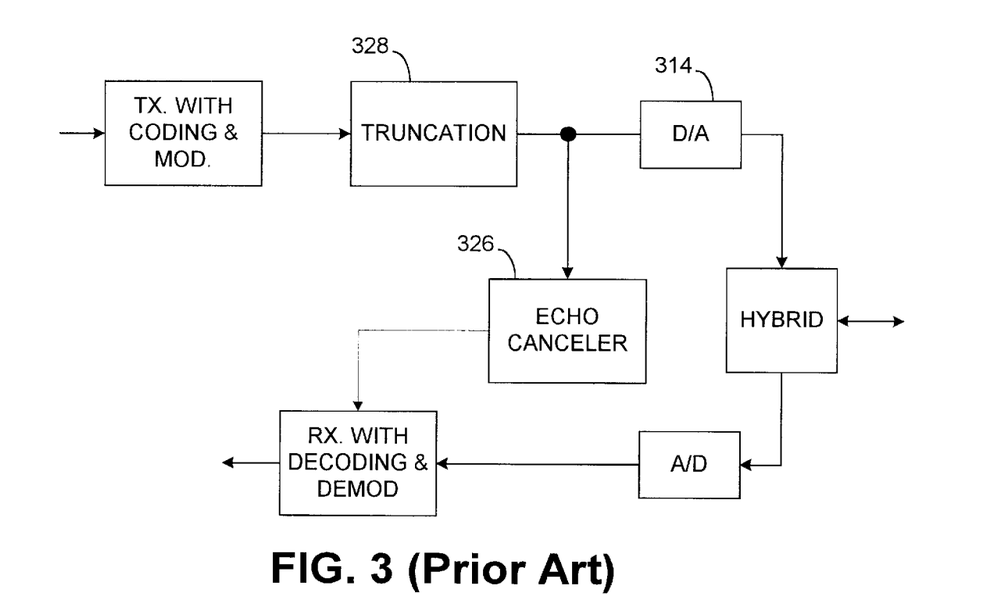
FIG. 3 is a block diagram illustrating yet another prior art system.

U.S. Pat. No. 5,623,513 discloses a prior art system for mitigating the effects of clipping and quantization in a digital transmission system. Such a system is illustrated in FIG. 3, which illustrates an implementation of a clipping or truncation function 328 prior to a sampling point for an echo canceler. In the system of FIG. 3, the signal which is supplied to the D/A converter 314, having been limited and truncated in the unit 328 to take into account the characteristics of the DAC, is not subject to any further quantization noise or clipping noise within the DAC. This same signal is supplied to the echo canceller 326, which accordingly operates on the same signal which is supplied to the DAC and which is not subject to further nonlinear distortion due to quantization or clipping.

While such a system reduces the effects of quantization and clipping, insofar as the echo canceler is concerned, effects of this clipping are still noted as distortion in a remote receiver.

Accordingly it is desired to provide a DMT transmitter that avoids clipping altogether.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the objects and advantages of the present invention, the present invention is directed to a system and method for reducing the need to perform signal clipping in a DMT transmitter. In accordance with one aspect of the invention, a method performs an inverse Fourier Transform on the input to produce a time-domain, digital value to be transmitted to a remote receiver. The method then evaluates the magnitude of the digital value to determine whether the magnitude exceeds a threshold value. Then, the method alters the input and re-performs an inverse Fourier Transform on the altered input, only if the step of evaluating the magnitude determines that the magnitude of the digital value exceeds the threshold value.

In this way, the inverse Fourier Transform is repeated (recursively) until a digital, time-domain signal is produced that is below a threshold level that would otherwise be clipped. Thus, no distortion is introduced into the signal due to clipping, either at the remote receiver or as echo at the near end receiver.

In accordance with another aspect of the invention, a discrete multi-tone (DMT) transmitter circuit is provided, which reduces the need to perform signal clipping. The circuit includes IFFT means for generating an inverse Fourier Transform, and generating means for generating in input for the IFFT means. Preferably, the input is generated from a mapper circuit, which maps a signal value into a signal constellation, to produce an encoded symbol preferably having good noise immunity for communication to a remote receiver. The circuit further includes determining means for determining whether an output of the IFFT means exceeds a threshold value. This determining means may be in the form of a magnitude detector circuit that is configured to detect a digital value having a magnitude that exceeds a predetermined maximum value (e.g., a clipping threshold value). Finally, the circuit further includes altering means for altering the input if the output of the IFFT means exceeds the threshold value. In one embodiment, this altering means could be in the form of circuit that is configured to rotate the predefined signal constellation of the mapper circuit. In another embodiment, the altering means could be operative to add additional input values to otherwise unused bins for the IFFT. Adding values in this way will, necessarily, alter the output of the IFFT, and therefore affect the magnitude of the signal output therefrom.

In addition to recursively altering the input until the magnitude of the digital signal output from the IFFT is such that no clipping will be performed on the signal, one embodiment of the invention may further ensure that only a few input bits have been altered. Specifically, the input may be recursively altered until no clipping will result, and only a relatively few input bits have been altered. With the alteration of only a few bits, a Reed Solomon decoder at the remote receiver may treat the alteration as an error, and correct the error (e.g., error correction coding). In such an embodiment, information about the manner in which the input was altered need not be communicated to the receiver.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 4:
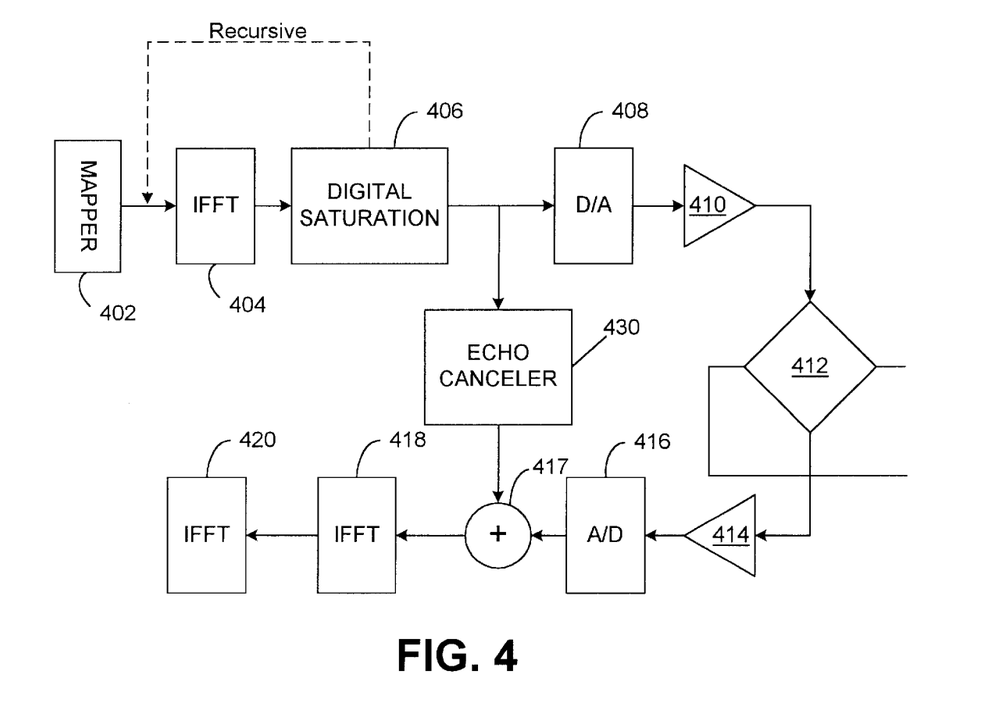
FIG. 4 is a block diagram illustrating one embodiment of a system constructed in accordance with the invention.

Turning now to the drawings, reference is made to FIG. 4, which is a block diagram illustrating principal components of one embodiment of the present invention. More particularly, the block diagram of FIG. 4 illustrates principal components in a DMT transmitter constructed in accordance with one aspect of the present invention. In a manner that is known, data to be transmitted is routed to a mapper 402, which performs a look-up function to output a data symbol. The output of the mapper 402 is, in turn, directed to a circuit configured to perform an inverse Fourier transform 404. Preferably, an inverse fast Fourier transform (IFFT) is performed. As is known, an inverse Fourier transform converts data from the frequency domain into time domain data.

Figure 5:
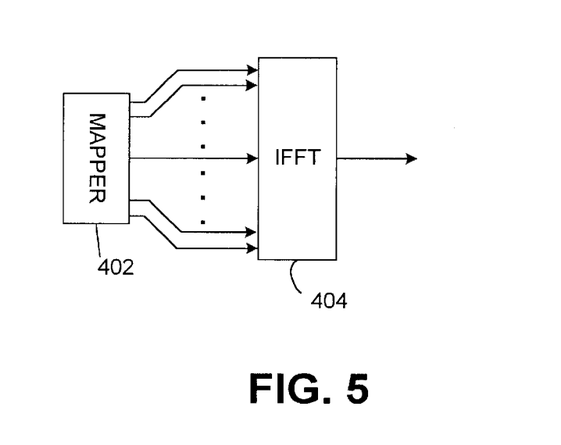
FIG. 5 is a block diagram graphically illustrating a mapper/IFFT portion of the system of FIG. 4.

In practice, the IFFT 404 will receive a plurality of inputs, which are successively output from the mapper 402. This is graphically illustrated in FIG. 5, where the mapper 402 is illustrated as providing a plurality of inputs to the IFFT 404. From this plurality of inputs, the IFFT 404 generates a time domain output signal. It should be appreciated that the mapper 402 outputs are not simultaneous (as depicted), but are rather successive.

In keeping with the description of FIG. 4, the output of the IFFT 404 is directed to a block denoted as digital saturation 406. This circuit block may be configured to perform a clipping-like function using digital signal processing techniques. Alternatively, the digital saturation block 406 may implement a recursive feedback to the input of the IFFT. In such a configuration, the saturation block 406 may operate to alter the signal(s) input to the IFFT, so that the resulting magnitude of the signal output from the IFFT 406 is altered.

The output of block 406 is directed to a digital to analog converter 408 (D/A converter), which converts the signal from a digital signal into an analog signal. This analog signal is then passed through a line driver 410 and is placed onto a local loop via a hybrid circuit 412. By performing the clipping or saturation function 406 before passing the signal to the D/A converter 408, the signal is assured not to over saturate either the D/A converter 408 or the line driver 410 of the analog front end. Stated another way, it is desirable to ensure that the peak value of the signal delivered to the D/A converter is less than a value that, when converted into analog form, would saturate at either the D/A converter 408 or the line driver 410.

Having described the transmit path, the receive path of a DMT transceiver is also illustrated. In short, the receive path includes a receiver 414 configured to receive an input signal from the hybrid circuit 412. This signal is in analog format and is passed to A/D converter 416, which converts the signal into the digital domain. This signal is then passed to a time domain equalizer 418, which performs signal equalization in a manner that is known in the art. Finally, this signal is directed to a fast Fourier transform circuit 420, which converts the signal from the time domain into the frequency domain.

As is further illustrated, a digital echo canceler 430 is also included within the transceiver circuitry. When full-duplex transmission (i.e., transmission of data in opposite directions simultaneously) uses overlapping frequency bands, echo is the undesired leakage of a transmitted signal into the co-located receiver, superimposed upon and thus interfering with the intended reception. As an example, in a telephone network, one type of echo occurs when a customer's transmitted signal leaks through the hybrid circuit back into that customer's receiver, interfering with the transmitted signal from another customer.

In a communication over wire, such as ADSL (asymmetric digital subscriber line), the data traveling in the two opposite directions use asymmetric but sometimes overlapping signal bandwidth. Even in cases where the in-band spectra in the two opposite directions do not overlap, the inevitable transition bands may still cause in-band echoes. An echo cancellation technique must then be employed to separate the upstream and downstream signals in the overlapping spectrum. The performance of an echo canceler is of essence since in many cases the echo is much stronger than the intended signal.

Thus, as is known, the echo canceler 430 operates to approximate the echo that is received back from the hybrid circuit of the remote transceiver, and subtract an appropriate amount from the received signal (i.e., an amount equal to the estimated echo), by adder 417. The echo canceler uses as an input the signal output from the digital saturation block 406. Importantly, if the digital saturation circuit performs a clipping function, it is preferred that this clipping function be performed before the sampling of the signal for the echo canceler 430. Although such clipping may result in a small amount of distortion at the remote receiver, having clipped upstream of the echo canceler, a much better signal will result in the receive path of the circuit illustrated in FIG. 4.

Figure 6:
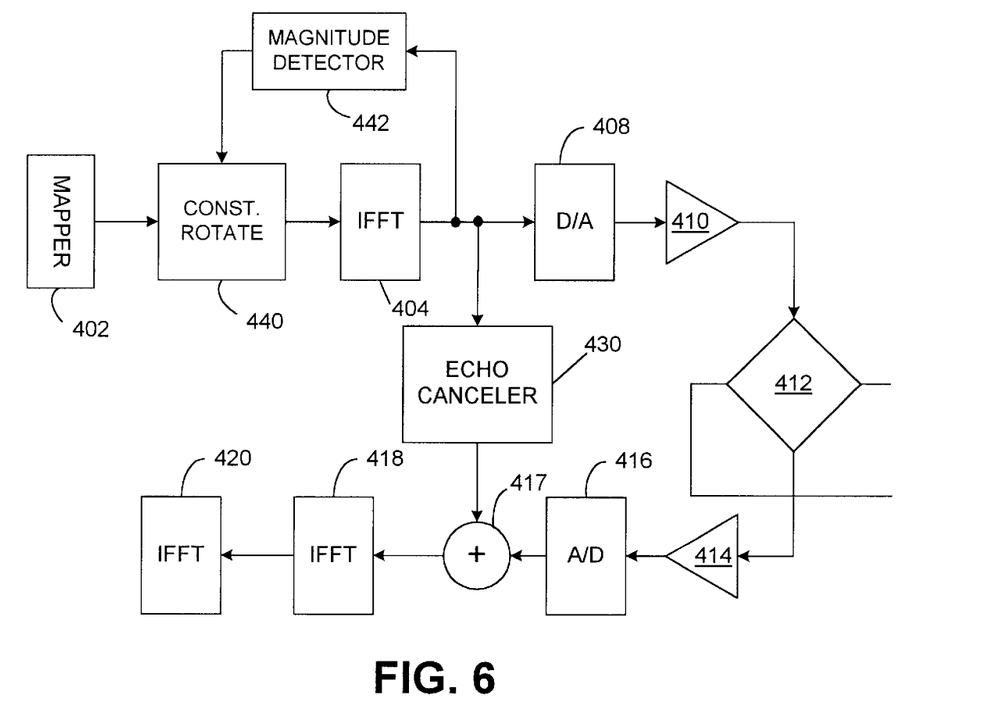
FIG. 6 is a block diagram illustrating one embodiment of a system constructed in accordance with one embodiment of the invention.

Reference is now made to FIG. 6, which is a block diagram similar to the diagram illustrated in FIG. 4, with a slightly different configuration surrounding the IFFT circuitry 404. In accordance with one embodiment of the present invention, clipping is avoided by ensuring that the magnitude of the digital signal that is output from the IFFT circuit 404 is below a predetermined threshold, where the threshold value is a value above which would result in either saturation of the D/A converter 408 or saturation of the line driver 410. Preferably, the circuitry surrounding the IFFT circuit 404 ensures that no clipping occurs, by performing the inverse FFT operation recursively, if necessary. For example, one way of carrying out this feature is to provide a magnitude detection circuit 442, which is configured to sample the output digital signal of the IFFT circuit 404 and compare the magnitude of that signal to a predetermined threshold. If the magnitude of the signal output from the IFFT circuit 404 exceeds the predetermined threshold, then the magnitude detector 442 may generate an output that would lead to a recomputation of the IFFT 404. It should be appreciated that this recomputation of the IFFT would be performed in such a way that a differing result would be obtained. This different result could then be, again, compared to a predetermined threshold value to determine whether any clipping will result. A different output (and therefore different magnitude) of the IFFT is achieved by providing a differing input to the IFFT circuit 404. One way of providing such a differing input is to provide a circuit capable of rotating a signal constellation so that a differing symbol (or series of consecutive symbols) is sent to the IFFT circuit 404. Although such a rotation feature may be built into the mapper 402, it has been graphically illustrated in FIG. 6 by circuit block denoted as constellation rotation 440. Thus, the signal constellation may be rotated whereby new signal values are input to the IFFT circuit, and therefore a differing output is produced by the IFFT circuit 404. Again, this output may be evaluated by the magnitude detector circuit 442 and the constellation may be further rotated if necessary.

It will be appreciated that, in many instances, the data manipulation that is performed upon the data that is delivered to the IFFT circuit 404 must be conveyed to the remote transceiver unit, so that an appropriate inverse action may be performed at the remote end so that the encoded data values may be extracted from the received signal.

It will be appreciated, however, that if the constellation rotation can be performed in such a way that less than, for example, two bits of information are changed or modified, then such rotation information may not need to be transmitted to the remote transceiver, as such a small amount of error could be corrected through the use of a Reed-Solomon decoder, and the redundancy of error correction coding. Such error correction coding is known in the art, and need not be described herein in order to understand the concepts of the present invention.

Figure 7:
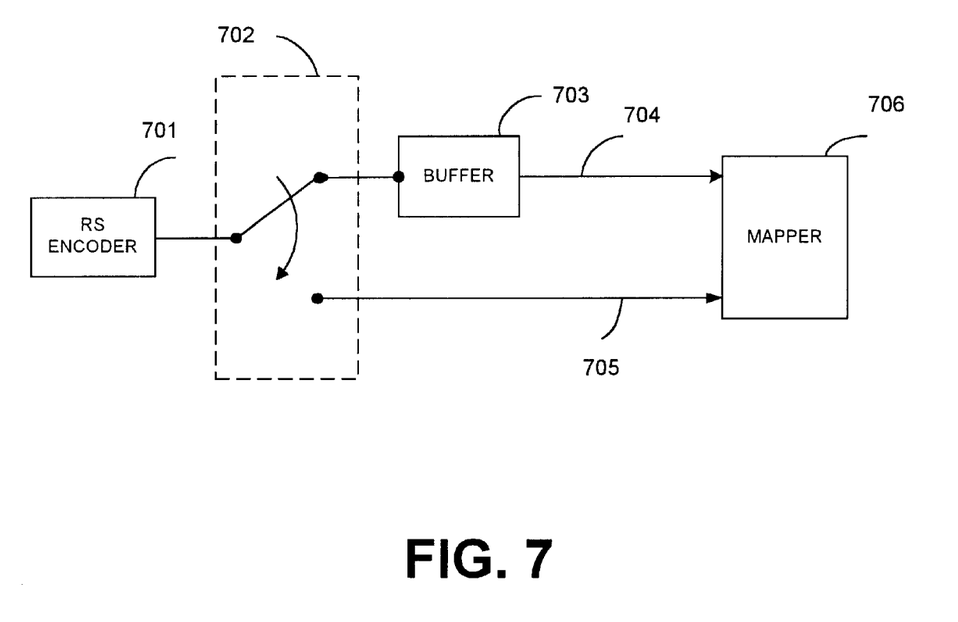
FIG. 7 is a block diagram illustrating an alternative embodiment, which need not communicate modifications applied for clipping reduction to a remote receiver, by using error correction circuitry (such as a Reed-Solomon coder)

Nevertheless, reference is made to FIG. 7, which illustrates one way in which this concept may be implemented. Block 701 is a conventional Reed-Solomon Encoder, which works on a byte basis. Switch 701 divides the output data stream of 701 into two paths. Data stream 705 is directly sent to mapper 706. Data stream 704, however, is buffered by block 703. One or two bits from block 703 are fed into mapper 706 for every output that it generates. If mapper 706 is appropriately designed, these bits can offer the control of rotation of the constellation. At a receiver, a reverse procedure is performed before the Reed Solomon decoder, in order to recover the bitstream. The idea behind the use of buffer 703 is to place all the bits controlling constellation rotation into packed bytes, because Reed Solomon coder corrects data on byte basis. Whenever clipping is detected, the contents of the buffer can be altered to change the orientation of the constellation, which in turn reduces clipping.

Figure 8:
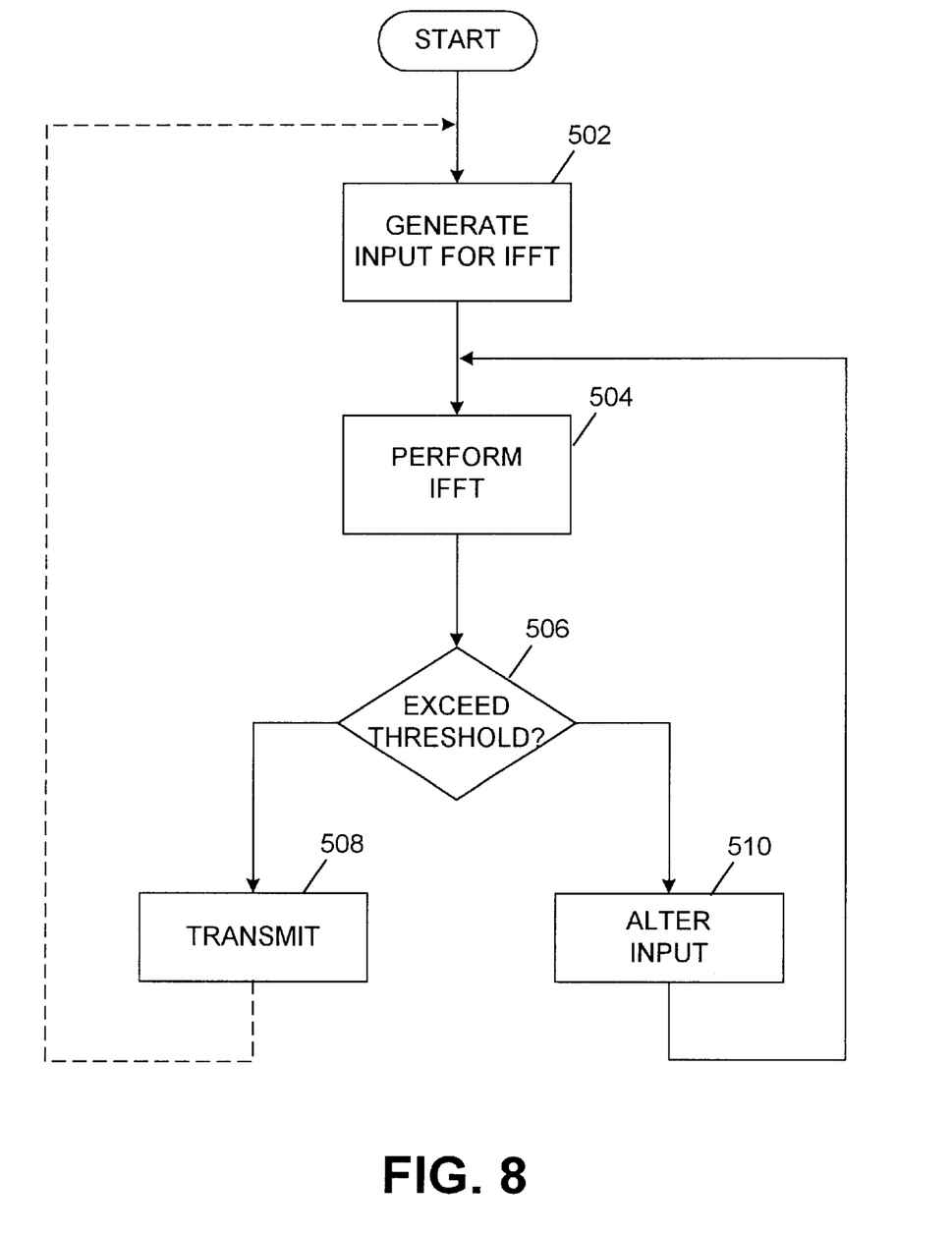
FIG. 8 is a flowchart illustrating a top-level functional operation of a method of the present invention.

In accordance with another aspect of the present invention, a novel method is provided for reducing the need to perform signal clipping in a DMT transmitter comprising certain fundamental steps. Reference is made to FIG. 8, which is a flow chart illustrating the principal steps involved in one embodiment of the present invention. In accordance with this embodiment, an input (or series of consecutive input signals) is provided to an IFFT circuit (step 502). The IFFT circuit then performs the inverse fast Fourier transform upon the input (step 504). Thereafter, the output of the IFFT may be evaluated to determine whether it exceeds a predetermined threshold value (step 506). If not, then no saturation will take place in either the D/A converter or the line driver of the analog front end circuitry, and the transmitter may transmit the signal in a manner that is typically performed (step 508). Alternatively, if step 508 determines that the output of the IFFT exceeds a predetermined threshold, then a method in accordance with the invention will alter the input values of the signals supplied to the IFFT circuit (step 510) and returned to step 504, where the IFFT will again be performed on the altered input.

Although not specifically illustrated, additional steps may also be provided. For example, when transmitting a signal resulting from an altered IFFT input, a method may additionally evaluate the number of data bits that are modified at the input of the IFFT. Generally, the method will communicate the bit modifications to a remote receiver. However, if fewer than a predetermined number of bits are modified, the method may optionally not communicate the modifications to the remote receiver, and allow the error correction circuitry (such as Reed-Solomon decoder) to correct the error. Although this lowers the error correction capability of the receiver in one respect, it still provides overall improvement since the distortion that otherwise results from clipping is eliminated.

It will be appreciated that what is provided herein is a novel method and apparatus for ensuring that clipping is not performed in a DMT transmitter. In this regard, a recursive methodology is implemented such that if clipping, or saturation were to otherwise occur, an input signal may be modified (in a recursive fashion) to ensure a magnitude of an output signal sufficiently low enough to avoid clipping. In appropriate circumstances, information regarding the manner in which the input signal is modified is also encoded into the signal that is transmitted to a remote receiver, so that the remote receiver can appropriately and accurately obtain the input data that is to be transmitted.

The embodiment or embodiments discussed herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. In a discrete multi-tone (DMT) transmitter, a method for reducing the need to perform signal clipping comprising the steps of:

providing an input;

performing an inverse Fourier Transform on the input to produce a digital value to be transmitted;

evaluating the magnitude of the digital value to determine whether the digital value will saturate an operative downstream component; and altering the input and re-performing an inverse Fourier Transform on the altered input if the step of evaluating the magnitude determines that the magnitude of the digital value will saturate the operative downstream component;

wherein the step of altering the step of providing an input includes producing the input from a mapper, and the step of altering the input includes rotating a signal constellation defined by the mapper.

2. The method as defined in claim 1, further including the step of repeating the evaluating and altering steps until the evaluating step determines that the magnitude of the digital value does not saturate the operative downstream component.

3. The method as defined in claim 1, further including the steps of encoding information pertaining to the altered input and communicating that information to a remote receiver.

4. The method as defined in claim 1, wherein the step of performing an inverse Fourier Transform more specifically includes performing an inverse Fast Fourier Transform (IFFT).

5. The method as defined in claim 1, wherein the step of performing an inverse Fourier Transform is performed on a constellation point, which is an output of a mapper.

6. The method as defined in claim 1, wherein the operative downstream component is a digital to analog converter.

7. The method as defined in claim 1, wherein the operative downstream component is an analog front end component.

8. In a discrete multi-tone (DMT) transmitter, a method for reducing the need to perform signal clipping comprising the steps of:

performing an inverse Fast Fourier Transform (IFFT) on an input to produce a digital value to be transmitted;

evaluating the magnitude of the digital value to determine whether the magnitude will saturate an operative downstream component; and recursively altering the input and re-performing the IFFT until the magnitude of the digital value will not saturate an operative downstream component;

wherein the step of recursively altering the input is consecutively executed until the magnitude of the digital value will not saturate the operative downstream component and the number of bits altered is less than a predetermined number, so that Reed Solomon decoding at a receiver may recover the signal, without having to communicate additional information bits.

9. In a discrete multi-tone (DMT) transmitter, a method for reducing the need to perform signal clipping comprising the steps of:

performing an inverse Fast Fourier Transform (IFFT) on an input to produce a digital value to be transmitted;

evaluating the magnitude of the digital value to determine whether the magnitude will saturate an operative downstream component; and recursively altering the input and re-performing the IFFT until the magnitude of the digital value will not saturate an operative downstream component; and communicating additional information bits to a remote receiver, wherein the additional information bits inform the remote receiver as to the manner in which the input was altered, so that the original input may be recovered.

* * * * *